Patented May 24, 1932

1,859,477

UNITED STATES PATENT OFFICE

WILLIAM ARTHUR SILVESTER, OF BLACKLEY, MANCHESTER, ENGLAND, ASSIGNOR TO BRITISH DYESTUFFS CORPORATION LIMITED, OF MANCHESTER, ENGLAND

DYESTUFFS OF THE UREA-AZINE SERIES AND PROCESS OF PREPARING THE SAME

No Drawing. Application filed May 16, 1928, Serial No. 278,340, and in Great Britain June 7, 1927.

This invention relates to a new series of dyes capable of dyeing cotton directly and applicable also to the dyeing of regenerated cellulose materials.

It is well known that simple sulphonated aminoazo compounds may be converted by phosgenation into direct cotton dyes (see, for example, Colour Index, Nos. 347, 348 and 349).

I have now discovered that by the action of phosgene upon certain acid wool dyes, other than azo dyes, containing a free amino or mono-substituted amino group, under conditions to be described, compounds of the urea type are formed which have good direct affinity for cotton.

The present invention consists in the preparation of ureas derived from sulphonated azines containing as substituent at least one free amino group or mono-substituted amino group external to the azine ring system, that is, complex urea dyes having the probable formula

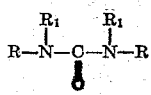

wherein $R_1$ represents hydrogen of a substituent group and R represents a sulphonated azine nucleus of the type

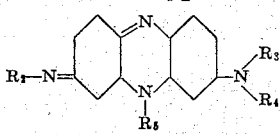

which contains two or more sulphonic groups and wherein $R_2$ and $R_5$ represent an aryl residue and $R_3$ and $R_4$ represent alkyl, aryl or aralkyl groups, the said sulphonated azine nucleus being attached to the nitrogen of the urea nucleus by a carbon atom which is external to the azine ring system. These complex urea dyes are dark colored powders and dye wool, cotton and regenerated cellulose in a very advantageous manner. These products may be obtained by the action of phosgene preferably in the presence of an acid-binding agent, upon suitably chosen acid wool dyes of the azine series; or, alternatively, they may be synthesized from suitable ureas by the usual reactions for the formation of azines. Thus we may start with a sulphonated azine acid wool dye of the type:

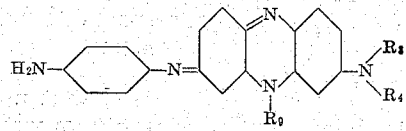

which contains two or more sulphonic groups and wherein $R_3$ and $R_4$ represent alkyl, aryl or aralkyl groups and $R_9$ represents a monovalent aryl residue. A compound of this structure possesses little, or no direct affinity for cotton or for regenerated cellulose. By phosgenation in the presence of an alkali it is converted into a urea having the probable structure:

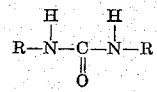

wherein R represents a sulphonated azine nucleus of the type

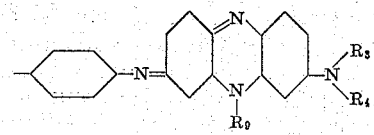

which contains two or more sulphonic groups and wherein $R_3$ and $R_4$ represent alkyl, aryl or aralkyl groups and $R_9$ represents a monovalent aryl nucleus.

Under the broad class of dyes of the present invention I find that the subclass of dyes wherein the sulphonated azine nucleus contains three sulphonic groups are especially advantageous. This subclass may be represented by the probable general formula

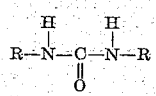

wherein R represents a sulphonated azine nucleus of the type

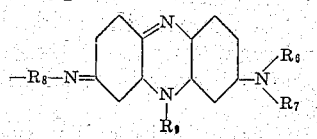

which contains three sulphonic groups and wherein $R_6$ represents an alkyl group, $R_7$ represents alkyl or aralkyl groups, $R_8$ represents a divalent aryl nucleus and $R_9$ represents a monovalent aryl nucleus. These complex ureas are dark colored powders soluble in water to blue to violet solutions, sparingly soluble in alcohol, regenerating, by prolonged hydrolysis with alkalies, acid wool colors of the azine series containing a diazotizable amino group. These complex urea dyes have affinity for wool, cotton and regenerated cellulose materials and produce blue shades upon these materials, the exact shade varying with the specific sulphonated azine nucleus present in the complex urea.

Other azine acid wool dyes, in which the amino group or mono-substituted amino group is situated in other parts of the molecule, may also be used as parent materials for phosgenation.

My invention is illustrated, but not limited, by the following example, in which the parts are by weight.

*Example.*—Ten parts of the acid wool dyestuff of the formula:

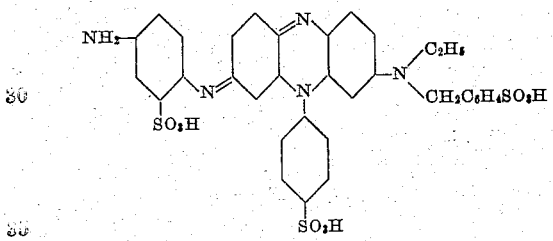

(see German Patent No. 193,472, Examples 1 and 3), are dissolved, as sodium salt, in 200–300 parts of water. Carbonyl chloride is passed into the solution and at the same time aqueous sodium hydroxide is added in sufficient quantity to keep the solution weakly alkaline to litmus. The introduction of carbonyl chloride into the solution is continued until a spot on absorbent paper no longer changes in color when moistened with dilute hydrochloric acid. Up to 20 parts of 30% sodium hydroxide solution with the chemically equivalent amount of carbonyl chloride are needed. The product is salted out and dried in the usual way. In the form of its sodium salt, the urea is a bronzy, dark blue powder, giving in water at a dilution of 1:3000 a violet solution and at greater concentrations, (such as 1:500) a blue solution, a blue solution being also obtained at the higher dilutions by addition of sodium chloride, the said urea giving in concentrated sulphuric acid a bright green solution becoming blue on dilution with separation of a blue flocculent precipitate, the said urea dyeing cotton and regenerated cellulose materials in bright blue shades, and wool in somewhat redder blue shades.

Amongst other acid azine dyes which I have found to give similar results are those having the following formulae:

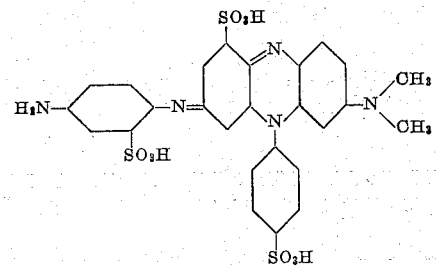

The complex urea derived from this compound gives a bright greenish blue dye.

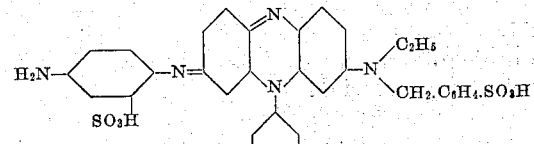

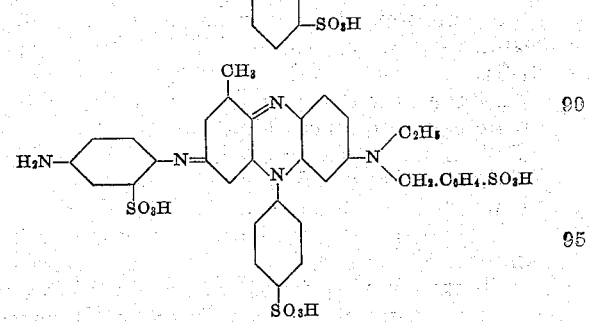

These dyes are all made by the general method of German Patent No. 193,472, and their conversion into my new products takes place quite smoothly as described in the example given above.

For the production of the most valuable products according to my invention, I start with an azine dye containing three sulphonic groups, which may be disposed in any convenient positions in the molecule.

What I claim and desire to secure by Letters Patent is:—

1. In the manufacture of new complex urea dyes suitable for dyeing cotton and regenerated cellulose, the process which comprises treating with phosgene a sulphonated azine acid wool dye having an azine nucleus of the type

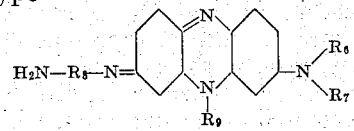

which contains three sulphonic groups and wherein $R_8$ represents a benzene nucleus, $R_9$ represents a benzene nucleus, $R_6$ represents an alkyl group and $R_7$ represents an alkyl or aralkyl group.

2. In the manufacture of new complex urea dyes suitable for dyeing cotton and regenerated cellulose, the process which comprises treating with phosgene a sulphonated azine wool dye having an azine nucleus of the type

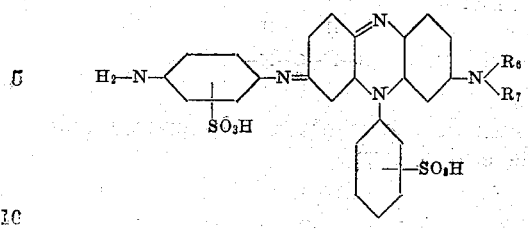

which contains three sulphonic groups and wherein $R_6$ represents an alkyl group and $R_7$ represents an alkyl or aralkyl group.

3. In the manufacture of new complex urea dyes suitable for dyeing cotton and regenerated cellulose, the process which comprises treating with phosgene a sulphonated azine acid wool dye having an azine nucleus of the type

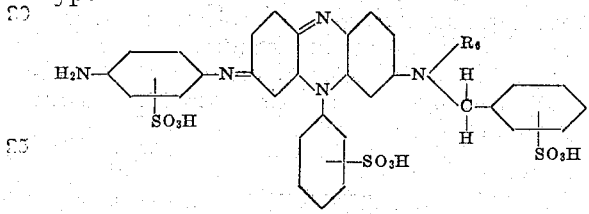

wherein $R_6$ represents an alkyl group.

4. In the manufacture of new complex urea dyes suitable for dyeing cotton and regenerated cellulose, the process which comprises treating with phosgene a sulphonated azine acid wool dye having an azine nucleus of the type

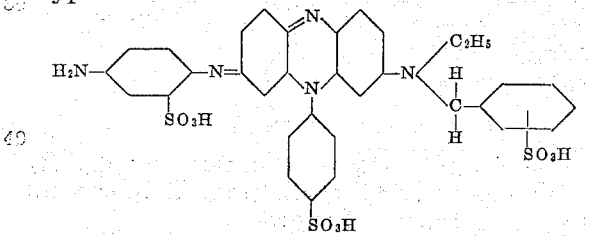

5. The process of claim 1 in which the treatment with phosgene is performed in the presence of caustic alkali.

6. The process of claim 1 in which the treatment with phosgene is performed in the presence of sodium hydroxide.

7. As new articles of manufacture, the complex urea dyes having the probable general formula

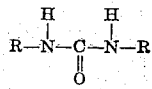

wherein R represents a sulphonated azine nucleus of the type

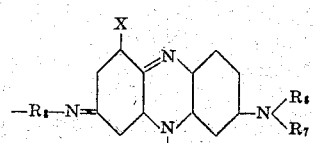

which contains three sulphonic groups and in which the

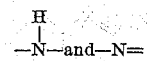

groups are attached to $R_8$ in the para position with respect to each other, and wherein $R_8$ represents a benzene nucleus, $R_9$ represents a benzene nucleus, $R_6$ represents an alkyl group, $R_7$ represents an alkyl or aralkyl group and X represents hydrogen, an alkyl or sulphonic group, the said complex urea dyes being dark colored powders and dyeing wool, cotton and regenerated cellulose in blue shades.

8. As new articles of manufacture, complex urea dyes having the probable general formula

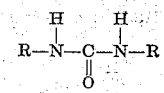

wherein R represents a sulphonated azine nucleus of the type

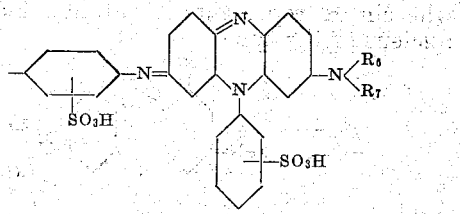

which contains three sulphonic groups and wherein $R_6$ represents an alkyl group and $R_7$ represents an alkyl or aralkyl group, the said complex urea dyes being dark colored powders and dyeing wool, cotton and regenerated cellulose in blue shades.

9. As new articles of manufacture, complex urea dyes having the probable general formula

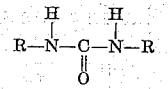

wherein R represents a sulphonated azine nucleus of the type

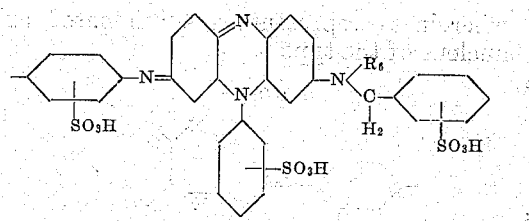

wherein $R_6$ represents an alkyl group, the said complex urea dyes being dark colored powders and dyeing wool, cotton and regenerated cellulose in blue shades.

10. As new articles of manufacture, complex urea dyes having the probable general formula

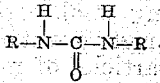

wherein R represents a sulphonated azine nucleus of the type

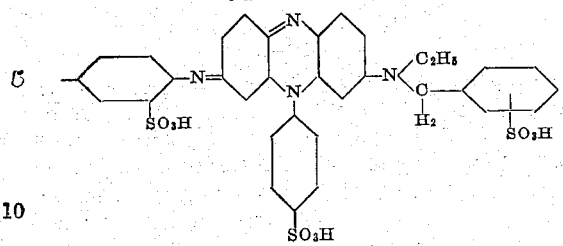

the said complex urea dyes being bronzy, dark blue powders and dyeing cotton and regenerated cellulose materials in bright blue shades and wool in somewhat redder blue shades.

11. As new articles of manufacture, complex urea dyes having the probable general formula:

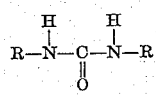

wherein R represents a sulphonated azine nucleus of the type

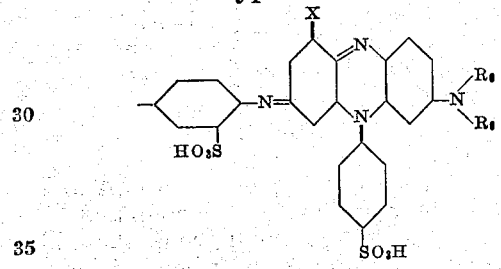

wherein $R_6$ represents an alkyl group and X represents H or $SO_3H$ being dark colored powders and dyeing wool, cotton and regenerated cellulose bright greenish blue shades.

12. As new articles of manufacture, complex urea dyes having the probable general formula:

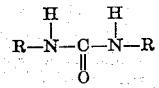

wherein R represents a sulphonated azine nucleus of the type

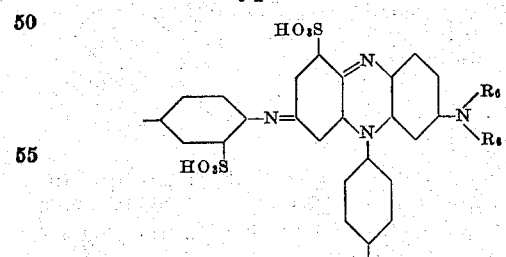

wherein $R_6$ represents an alkyl group, said complex urea dyes being dark colored powders and dyeing wool, cotton and regenerated cellulose bright greenish blue shades.

13. As new articles of manufacture, complex urea dyes having the probable general formula:

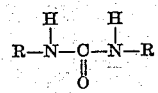

wherein R represents a sulphonated azine nucleus of the type

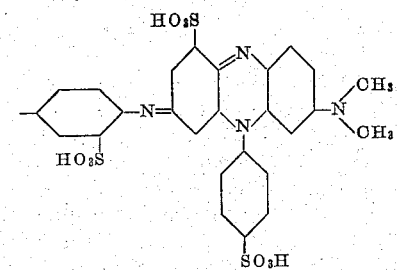

said complex urea dyes being dark colored powders and dyeing wool, cotton and regenerated cellulose in blue shades.

14. As new articles of manufacture, complex urea dyes having the probable general formula:

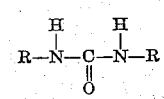

wherein R represents a sulphonated azine nucleus of the type

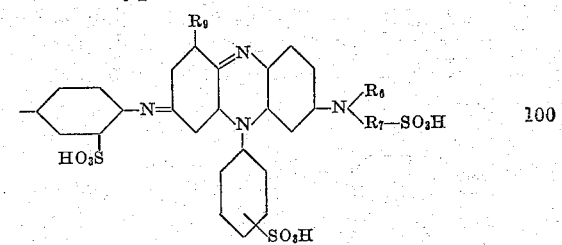

wherein $R_6$ represents an alkyl group and $R_7$ represents an aralkyl group and $R_9$ represents hydrogen or an alkyl group.

15. As new articles of manufacture, complex urea dyes having the probable general formula:

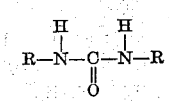

wherein R represents a sulphonated azine nucleus of the type

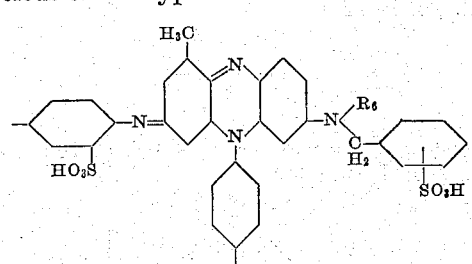

wherein $R_6$ represents an alkyl group.

16. As new articles of manufacture, complex urea dyes having the probable general formula:
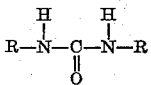
wherein R represents a sulphonated azine nucleus of the type
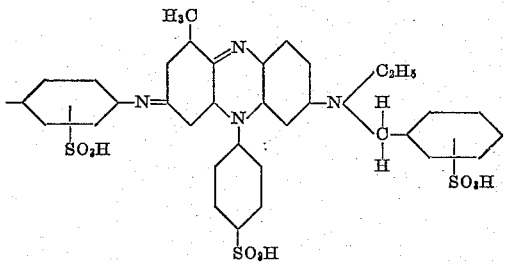
said complex urea dyes being dark powders and dyeing wool, cotton and regenerated cellulose in blue shades.
In testimony whereof I affix my signature.
WILLIAM ARTHUR SILVESTER.

CERTIFICATE OF CORRECTION.

Patent No. 1,859,477.                                              May 24, 1932.

WILLIAM ARTHUR SILVESTER.

It is hereby certified that error appears in the printed specification of the above numbered patent requiring correction as follows: Page 1, line 27, for the word "of" read or; and that the said Letters Patent should be read with this correction therein that the same may conform to the record of the case in the Patent Office.

Signed and sealed this 12th day of July, A. D. 1932.

M. J. Moore,
(Seal)                                                    Acting Commissioner of Patents.